(12) United States Patent
Itoh et al.

(10) Patent No.: US 10,654,978 B2
(45) Date of Patent: May 19, 2020

(54) TIRE

(71) Applicant: BRIDGESTONE CORPORATION, Chuo-ku, Tokyo (JP)

(72) Inventors: Yuki Itoh, Tokyo (JP); Soichi Kyo, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/513,557

(22) PCT Filed: Sep. 24, 2015

(86) PCT No.: PCT/JP2015/076979
§ 371 (c)(1),
(2) Date: Mar. 23, 2017

(87) PCT Pub. No.: WO2016/047707
PCT Pub. Date: Mar. 31, 2016

(65) Prior Publication Data
US 2017/0298189 A1    Oct. 19, 2017

(30) Foreign Application Priority Data

Sep. 24, 2014  (JP) ................................ 2014-193429

(51) Int. Cl.
| | | |
|---|---|---|
| B60C 1/00 | (2006.01) |
| C08G 81/00 | (2006.01) |
| C08G 69/40 | (2006.01) |
| C08G 69/14 | (2006.01) |
| C08G 69/36 | (2006.01) |

(52) U.S. Cl.
CPC ............ C08G 81/00 (2013.01); B60C 1/0041 (2013.01); C08G 69/40 (2013.01); C08G 69/14 (2013.01); C08G 69/36 (2013.01); C08G 2380/00 (2013.01)

(58) Field of Classification Search
None
See application file for complete search history.

(56) References Cited

U.S. PATENT DOCUMENTS

| | | |
|---|---|---|
| 2013/0206301 A1 | 8/2013 | Fudemoto et al. |
| 2013/0206311 A1 | 8/2013 | Fudemoto et al. |
| 2015/0018495 A1 | 1/2015 | Fukushima et al. |
| 2016/0280008 A1 | 9/2016 | Fudemoto et al. |
| 2016/0303905 A1 | 10/2016 | Fudemoto et al. |
| 2017/0210167 A1 | 7/2017 | Itoh |
| 2017/0217251 A1 | 8/2017 | Itoh |
| 2017/0232796 A1 | 8/2017 | Itoh |
| 2017/0291991 A1 | 10/2017 | Itoh et al. |
| 2017/0298182 A1 | 10/2017 | Kyo |
| 2017/0320359 A1 | 11/2017 | Kyo et al. |

FOREIGN PATENT DOCUMENTS

| | | |
|---|---|---|
| CN | 103201121 A | 7/2013 |
| JP | S58-198527 A | 11/1983 |
| JP | S63-156855 A | 6/1988 |
| JP | 2009-255489 A | 11/2009 |
| JP | 2010-95604 A | 4/2010 |
| JP | 2012-046028 A | 3/2012 |
| JP | 2012-046030 A | 3/2012 |
| JP | 2012-046034 A | 3/2012 |
| JP | 2014-37551 A | 2/2014 |
| WO | 2013/129630 A1 | 9/2013 |

OTHER PUBLICATIONS

Extended European Search Report dated Jul. 5, 2017, issued in corresponding EP Patent Application EP 15844595.7.
Search Report of the Chinese office action dated Sep. 18, 2018, from the SIPO in a Chinese patent application corresponding to the instant patent application.

Primary Examiner — Ana L. Woodward
(74) Attorney, Agent, or Firm — Solaris Intellectual Property Group, PLLC

(57) ABSTRACT

A tire including a tire frame that is formed of a resin material and has a circular form, the resin material including a thermoplastic elastomer having a hard segment and a soft segment, and a polymer compound that has the same structural unit as the structural unit of the soft segment and which is different from the thermoplastic elastomer, a content of the polymer compound in the tire frame being from 0.20 parts by mass to 2.5 parts by mass with respect to 100 parts by mass of the thermoplastic elastomer contained in the tire frame.

9 Claims, 3 Drawing Sheets

TIRE

BACKGROUND OF THE INVENTION

The present invention relates to a tire to be fitted to a rim and, in particular, to a tire in which at least a portion of a tire case is formed of a resin material.

Background Art

Conventionally, in vehicles such as passenger cars, pneumatic tires constructed from rubber, organic fiber materials, steel members, and the like have been used.

In recent years, from the viewpoints of weight reduction, ease of molding, and ease of recycling, research has been conducted on the use of resin materials, as the tire materials; in particular, thermoplastic resins, thermoplastic elastomers, and the like. These thermoplastic polymer materials (thermoplastic elastomers, thermoplastic resin materials, and the like) have a lot of advantages from the viewpoint of improvement in productivity, such as enabling injection molding. For example, a tire manufactured by using a thermoplastic polyamide-based elastomer as the thermoplastic polymer material has been proposed (see Japanese Patent Application Laid-Open (JP-A) No. 2012-46030).

SUMMARY OF INVENTION

Technical Problem

Tires, in which a thermoplastic polymer material is used, are easily produced and are inexpensive, compared with conventional tires made of rubber. However, realization of tire performance that compares favorably to conventional tires made of rubber, while also achieving an increase in productivity at low cost, is required. Further, tires are expected to be used not only at ordinary temperature, but also in a low temperature region such as at a temperature equal to or lower than 0° C. Therefore, development of a tire that keeps various performances in a low temperature region is also required.

An embodiment of the invention has been made based on the above circumstances, and an object of the embodiment of the invention is to provide a tire which is formed using a resin material and which achieves both impact resistance at a low temperature and low loss property.

Solution to Problem

[1] A tire has a tire frame that is formed of a resin material and has a circular form; the resin material including a thermoplastic elastomer having a hard segment and a soft segment, and a polymer compound, that has the same structural unit as the structural unit of the soft segment and which is different from the thermoplastic elastomer; a content of the polymer compound in the tire frame being from 0.20 parts by mass to 2.5 parts by mass with respect to 100 parts by mass of the thermoplastic elastomer contained in the tire frame.

Advantageous Effects of Invention

According to an embodiment of the invention, a tire which is formed using a resin material and which achieves both impact resistance at a low temperature and low loss property may be provided.

MODES FOR CARRYING OUT INVENTION

Figure 1A:
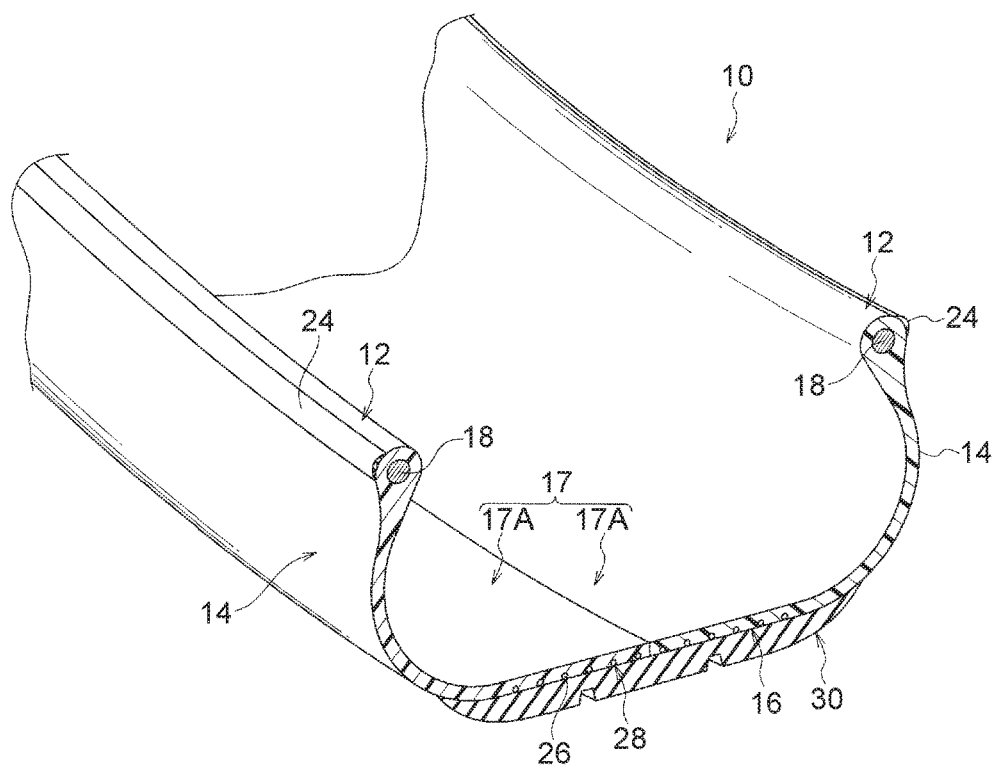
FIG. 1A is a perspective view illustrating a cross-section of a part of a tire according to one embodiment of the invention.

The tire according to an embodiment of the invention has a tire frame that is formed of a resin material and has a circular form. The resin material includes a thermoplastic elastomer having a hard segment and a soft segment, and a polymer compound, which has the same structural unit as that of the soft segment and which is different from the thermoplastic elastomer, such that the content of the polymer compound in the tire frame is from 0.20 parts by mass to 2.5 parts by mass, with respect to 100 parts by mass of the thermoplastic elastomer contained in the tire frame.

In the embodiment of the invention, a circular tire frame has a polymer compound, which has the same structural unit as that of a soft segment of a thermoplastic elastomer, in a range of from 0.20 parts by mass to 2.5 parts by mass with respect to 100 parts by mass of the thermoplastic elastomer. Therefore, the tire can achieve both impact resistance at a low temperature and low loss property. The reason for this is not clear, but the reason is guessed as described below.

Note that, in the present specification, the concept of the term "resin" encompasses thermoplastic resins and thermosetting resins, but does not encompass natural rubbers.

In the present specification, a numeral range expressed using "to" means a range including numerical values described in front of and behind "to" as the minimum value and the maximum value.

Further, in the present specification, in a case in which plural substances corresponding to a component are present in a composition, the amount of the component in the composition means the total amount of the plural substances that are present in the composition, unless otherwise specified.

In the following, the polymer compound, which has the same structural unit as that of the soft segment and which is different from the thermoplastic elastomer, is sometimes referred to as the "specific polymer". Further, the content of the specific polymer in the tire frame with respect to 100 parts by mass of the thermoplastic elastomer contained in the tire frame is sometimes referred to as, simply, the "content of the specific polymer".

A thermoplastic elastomer can be obtained by copolymerization using a polymer that forms a hard segment, a polymer that forms a soft segment and, if necessary, a chain extending agent. Accordingly, in the process of synthesizing a thermoplastic elastomer, there are cases in which a part of the raw material remains unreacted and a specific polymer, as the residue, is incorporated in the resin material.

It is thought that, when a large amount of specific polymer exists in the tire frame, the proportion of dynamic energy that is converted into heat relative to the dynamic energy that has been applied to the tire gets higher, and thus an increase in energy loss is caused. Meanwhile, it is thought that, in a case in which the content of the specific polymer is within the above range, compared with a case in which the content of the specific polymer is higher than the above range, the proportion of dynamic energy that is converted into heat is low, and thus the low loss property becomes favorable.

Accordingly, from the viewpoint of the low loss property of a tire, it seems that the lower the content of the specific polymer in the tire frame, the better. However, it was found in the invention that, when the content of the specific polymer in the tire frame is too low, the impact resistance of the tire at a low temperature is deteriorated. The reason for this is not clear, but it is thought as follows. Namely, since the glass transition temperature (Tg) of the specific polymer exists on the low temperature side as compared with the glass transition temperature of the thermoplastic elastomer, the impact energy that has been applied to the tire at a low temperature is converted into heat by the specific polymer contained in the tire frame and, as a result, the impact resistance of the tire at a low temperature is improved. Accordingly, it is thought that, in a case in which the content of the specific polymer is within the above range, compared with a case in which the content of the specific polymer is lower than the above range, the impact resistance at a low temperature is improved.

As described above, in the embodiment of the invention, since the content of the specific polymer is within the above range, both impact resistance at a low temperature and low loss property can be achieved, compared with a case in which the content is out of the above range.

Further, in the embodiment of the invention, since the content of the specific polymer is within the above range, durability of the tire at room temperature (at 25° C.) is high, compared with a case in which the content is higher than the above range. The reason for this is not clear but it is guessed as follows. Namely, there are cases in which the specific polymer contained in the tire frame forms a core at room temperature, to thereby cause cracking; however, when the amount of the specific polymer capable of forming a core is small, the durability is improved.

Moreover, in the embodiment of the invention, since the content of the specific polymer is within the above range, the tire productivity is favorable, compared with a case in which the content is higher than the above range.

When a large amount of specific polymer exists in the resin material which is a raw material of the tire frame, in the process of performing injection molding of the resin material to obtain a tire frame, the pellet shaped resin material may adhere to the inner wall of an injection molding machine. When the resin material adheres to the inside of an injection molding machine, weighing stability at the time of injection molding may be lowered, and the injection weighing time (time needed to supply a definite amount by using a fixed quantity supply device of the injection molding machine) may be increased more than expected. Particularly, in a case in which the content of the specific polymer in the tire frame that has been produced is high, the weighing stability at the time of injection molding may be deteriorated and the injection weighing time may become long, which may exert influence on the productivity of the tire frame.

Namely, it is thought that, in a case in which the content of the specific polymer is within the above range, compared with a case in which the content of the specific polymer is higher than the above range, the weighing stability is high and the injection weighing time can be shortened, and thus the productivity is enhanced.

Hereinafter, the resin material that forms the tire frame is explained.

<<Resin Material>>

As described above, the tire according to an embodiment of the invention has a tire frame formed using a resin material. The resin material includes at least a thermoplastic elastomer, which has a hard segment and a soft segment, and the specific polymer described above. Further, as a result of the formation of a tire frame, the resin material contains the thermoplastic elastomer and the specific polymer, such that the content of the specific polymer is from 0.20 parts by mass to 2.5 parts by mass.

The resin material may contain any component other than the thermoplastic elastomer or the specific polymer.

<Thermoplastic Elastomer>

The thermoplastic elastomer has at least a hard segment and a soft segment, and besides, may have a linking portion that connects two or more segments.

In the present specification, the term "linking portion" refers to a linking portion that connects two or more segments. Specific examples include a linking portion between a hard segment and a soft segment, a linking portion between hard segments, and a linking portion between soft segments. The linking portion is, for example, a portion that is connected by a chain extending agent described below.

Examples of the kinds of thermoplastic elastomers which can be applied to the embodiment of the invention include, as defined in JIS K6418: 2007, polyamide-based thermoplastic elastomers (Thermoplastic Amide elastomer, TPA), polyester-based thermoplastic elastomers (Thermoplastic polyester elastomer, TPC), polyolefin-based thermoplastic elastomers (Thermoplastic PolyOlefin, TPO), polystyrene-based thermoplastic elastomers (Styrenic Thermoplastic Elastomer, TPS), polyurethane-based thermoplastic elastomers (Thermoplastic Polyurethane, TPU), thermoplastic crosslinked rubbers (ThermoPlastic Vulcanizates, TPV), and other thermoplastic elastomers (Thermoplastic elastomers other, TPZ).

Among them, polyurethane-based thermoplastic elastomers (TPU), polyamide-based thermoplastic elastomers (TPA), and polyester-based thermoplastic elastomers (TPC) are preferable, since these are polymers having a linking portion formed through a polyaddition reaction and are polymers in which the physical properties of the thermoplastic elastomer can be changed by only changing, for example, the structure of the linking portion according to a method that has been established.

Further, among polyurethane-based thermoplastic elastomers (TPU), polyamide-based thermoplastic elastomers (TPA), and polyester-based thermoplastic elastomers (TPC), polyamide-based thermoplastic elastomers (TPA) are more preferable, from the viewpoints of the change in physical properties due to water and hydrolysis properties. The reason for this is because polyamide-based thermoplastic elastomers (TPA) are less likely to absorb water, as compared with polyurethane-based thermoplastic elastomers (TPU), and further, the amide bonds that constitute polyamide-based thermoplastic elastomers (TPA) have resistance to water and are less likely to decompose, as compared with the ester bonds that constitute polyester-based thermoplastic elastomers (TPC).

<Specific Polymer>

The specific polymer is not particularly limited as far as the specific polymer is a polymer which is different from the thermoplastic elastomer and which has the same structural unit as that of the soft segment of the thermoplastic elastomer.

The term "specific polymer" is "a polymer which is different" from the thermoplastic elastomer, and the concept of the term does not encompass the thermoplastic elastomer.

Further, the "polymer having the same structural unit as that of the soft segment" means a polymer that is formed of the structural unit(s) that the soft segment of the thermoplastic elastomer has, or a modified body of the above polymer, in which the terminal groups are modified. However, a number of the structural unit that the soft segment of the thermoplastic elastomer has may be different from a number of the structural unit that the specific polymer has. Further, in a case in which the soft segment of the thermoplastic elastomer has two or more kinds of structural units, the number ratio of the respective kinds of structural units may be different between the soft segment and the specific polymer.

Namely, for example, in a case in which the soft segment of the thermoplastic elastomer has a structure derived from a homopolymer of polypropylene glycol, the specific polymer is a homopolymer of polypropylene glycol or a modified body thereof in which the terminals are modified. Further, for example, in a case in which the soft segment has a structure derived from an ABA-type triblock copolymer described below, the specific polymer is the ABA-type triblock copolymer or a modified body thereof in which the terminals are modified.

Examples of the specific polymer include a polymer which forms the soft segment that is a raw material of the thermoplastic elastomer and which remains unreacted as it is, and a modified body of the polymer that forms the soft segment, in which the terminal groups are modified. For example, in a case in which the terminal group of a polymer that forms the soft segment is an amino group, examples of the terminal group of the specific polymer include, besides an amino group, an amido group, a proton group, an imino group, and a nitro group. Further, for example, in a case in which the terminal group of a polymer that forms the soft segment is a hydroxyl group, examples of the terminal group of the specific polymer include, besides a hydroxyl group, a proton group, a carboxyl group, and an aldehyde group.

As described above, the specific polymer is not limited to a substance obtained by using the polymer that forms the soft segment as a starting material, but may be a "polymer which has the same structural unit as that of the soft segment and which is different from the thermoplastic elastomer" that is added separately after the synthesis of the thermoplastic elastomer.

A number average molecular weight of the specific polymer is in a range of from 0.3 times to 6 times a number average molecular weight of the soft segment in the thermoplastic elastomer, desirably from 0.6 times to 3 times, and desirably from 0.9 times to 1.1 times.

As the specific polymer, a residue of the polymer which forms the soft segment that is a raw material of the thermoplastic elastomer (namely, an unreacted component of the polymer that forms the soft segment, or a modified body of the unreacted component in which the terminal groups are modified) may be utilized.

<Content of Specific Polymer>

The content of the specific polymer indicates, as described above, a content of the specific polymer contained in a "tire frame" that is formed using the resin material, with respect to 100 parts by mass of the thermoplastic elastomer contained in the "tire frame". The content of the specific polymer is from 0.20 parts by mass to 2.5 parts by mass, preferably from 0.30 parts by mass to 2.5 parts by mass, more preferably from 0.45 parts by mass to 2.5 parts by mass, and still more preferably from 0.56 parts by mass to 2.5 parts by mass, from the viewpoints of low loss property and impact resistance at a low temperature. The content of the specific polymer is particularly preferably from 0.75 parts by mass to 1.5 parts by mass, from the viewpoints of low loss property, impact resistance at a low temperature, and productivity. From the viewpoints of low loss property and productivity, it is preferable that the content of the specific polymer is low. However, from the viewpoint of impact resistance at a low temperature, it is preferable that the content of the specific polymer is high. Accordingly, it is possible to keep the balance of each performance at a high level, when the content of the specific polymer is from 0.75 parts by mass to 1.5 parts by mass.

Here, the content of the specific polymer can be determined as follows. Namely, the molecular weight of the resin material of the tire frame is measured by GPC (gel permeation chromatography), and by determining the area of a portion corresponding to the specific polymer from the obtained molecular weight distribution, the content of the specific polymer in the entire material is calculated. The solvent used for the measurement of GPC may be any solvent that does not dissolve the thermoplastic elastomer contained in the resin material but dissolves the specific polymer. Examples of the solvent include, but not particularly limited to, alcohol solvents such as ethanol or isopropanol.

An example of a method of adjusting the content of the specific polymer in the tire frame to be within the above range is a method of adjusting each of the content of the thermoplastic elastomer and the content of the specific polymer in the resin material used for forming the tire frame.

As described above, there are cases in which, as a result of the synthesis of a thermoplastic elastomer, a part of the polymer that forms the soft segment, which is a raw material, does not undergo polymerization and remains as a residue, thereby obtaining a resin material that is a mixture of the thermoplastic elastomer and the specific polymer (the residue).

Accordingly, when a tire frame is formed using a resin material which is obtained by synthesizing a thermoplastic elastomer in accordance with a conventional method without any particular regulation, there are many cases in which the content of the specific polymer becomes higher than the above range, and although it depends on the kind of the resin, the content usually becomes 3 parts by mass or higher. In such cases, by obtaining a resin material containing a small amount of residue through, for example, a method of reducing the proportion of the residue remained during the synthesis of the thermoplastic elastomer or a method of removing the residue remained after the synthesis, a tire frame in which the content of the specific polymer is within the above range can be finally obtained.

Examples of the method of reducing the proportion of the residue remained during the synthesis of the thermoplastic elastomer include, although it depends on the kind of the thermoplastic elastomer or the like, a method of adjusting the time period of copolymerizing the polymer that forms the hard segment and the polymer that forms the soft segment, a method of adjusting the ratio (supply amounts) of the amount (molar number) of the polymer that forms the hard segment and the amount (molar number) of the polymer that forms the soft segment, and a method of making the modification amount (proportion of the modified compound) close to 100% in a case in which a terminal-modified compound is used as the polymer that forms the soft segment.

Examples of the method of removing the residue remained after the synthesis of the thermoplastic elastomer include a method of purifying the resulting resin material through extraction using a solvent such as ethanol or the like (a solvent that does not dissolve the thermoplastic elastomer but dissolves the specific polymer), and the like.

Meanwhile, when a tire frame is formed using a resin material in which the amount of the residue is excessively reduced, there are cases in which the content of the specific polymer contained in the tire frame is lower than the above range. In such cases, by further adding the specific polymer with respect to the resin material in which the amount of the residue is excessively reduced, a tire frame in which the content of the specific polymer is within the above range can be obtained.

Hereinafter, the case of using, as the thermoplastic elastomer contained in the resin material, a polyamide-based thermoplastic elastomer (TPA), the case of using a polyurethane-based thermoplastic elastomer (TPU), and the case of using a polyester-based thermoplastic elastomer (TPC), each of which is a preferable thermoplastic elastomer described above, are explained, respectively.

<Case of Using Polyamide-Based Thermoplastic Elastomer>

In the present specification, the "polyamide-based thermoplastic elastomer" refers to a thermoplastic elastomer that is formed of a copolymer having a polymer constituting a hard segment that is crystalline and has a high melting temperature, and a polymer constituting a soft segment that is non-crystalline and has a low glass transition temperature, wherein the polymer constituting the hard segment has amide bonds (—CONH—) in the main chain thereof.

Examples of the polyamide-based thermoplastic elastomer include a material in which at least a polyamide constitutes a crystalline hard segment having a high melting temperature and another polymer (for example, a polyester, a polyether, or the like) constitutes a non-crystalline soft segment having a low glass transition temperature.

—Hard Segment—

Examples of the polyamide that forms the hard segment (the polymer that forms the hard segment) may include a polyamide that is synthesized using a monomer represented by the following Formula (1) or Formula (2).

H$_2$N—R$^1$—COOH                        Formula (1)

In Formula (1), R$^1$ represents a hydrocarbon molecular chain having a carbon number of from 2 to 20 or an alkylene group having a carbon number of from 2 to 20.

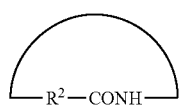

Formula (2)

In Formula (2), R$^2$ represents a hydrocarbon molecular chain having a carbon number of from 3 to 20 or an alkylene group having a carbon number of from 3 to 20.

In Formula (1), R$^1$ is preferably a hydrocarbon molecular chain having a carbon number of from 3 to 18 or an alkylene group having a carbon number of from 3 to 18, more preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15. Further, in Formula (2), R$^2$ is preferably a hydrocarbon molecular chain having a carbon number of from 3 to 18 or an alkylene group having a carbon number of from 3 to 18, more preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15.

Examples of the monomer represented by Formula (1) or (2) include an ω-aminocarboxylic acid and a lactam. Further, examples of the polyamide that forms the hard segment include a polycondensate of a ω-aminocarboxylic acid or a lactam, and a copolycondensate of a diamine and a dicarboxylic acid.

Examples of the ω-aminocarboxylic acid include aliphatic ω-aminocarboxylic acids having a carbon number of from 5 to 20, such as 6-aminocaproic acid, 7-aminoheptanoic acid, 8-aminooctanoic acid, 10-aminocapric acid, 11-aminoundecanoic acid, and 12-aminododecanoic acid. Further, examples of the lactam include aliphatic lactams having a carbon number of from 5 to 20, such as lauryllactam, ε-caprolactam, undecanolactam, ω-enantholactam, and 2-pyrrolidone.

Examples of the diamine include diamine compounds, for example, aliphatic diamines having a carbon number of from 2 to 20, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, and methaxylenediamine. Further, the dicarboxylic acid may be represented by HOOC—(R$^3$)m-COOH (R$^3$: a hydrocarbon molecular chain having a carbon number of from 3 to 20, m: 0 or 1), and examples thereof include aliphatic dicarboxylic acids having a carbon number of from 2 to 22, such as oxalic acid, succinic acid, glutaric acid, adipic acid, pimelic acid, suberic acid, azelaic acid, sebacic acid, and dodecanedioic acid.

Examples of the polyamide that forms the hard segment may include a polyamide (polyamide 6) obtained by ring-opening polycondensation of ε-caprolactam, a polyamide (polyamide 11) obtained by ring-opening polycondensation of undecanolactam, a polyamide (polyamide 12) obtained by ring-opening polycondensation of lauryllactam, a polyamide (polyamide 12) obtained by polycondensation of 12-aminododecanoic acid, a polyamide (polyamide 66) which is a polycondensation product of a diamine and a dibasic acid, and a polyamide (amide MX) which has meta-xylene diamine as a structural unit.

The polyamide 6 can be represented by, for example, {CO—(CH$_2$)$_5$—NH}$_n$ (wherein n represents an arbitrary number of repeating units) and, for example, n is preferably from 2 to 100, and more preferably from 3 to 50.

The polyamide 11 can be represented by, for example, {CO—(CH$_2$)$_{10}$—NH}$_n$ (wherein n represents an arbitrary number of repeating units) and, for example, n is preferably from 2 to 100, and more preferably from 3 to 50.

The polyamide 12 can be represented by, for example, {CO—(CH$_2$)$_{11}$—NH}$_n$ (wherein n represents an arbitrary number of repeating units) and, for example, n is preferably from 2 to 100, and more preferably from 3 to 50.

The polyamide 66 can be represented by, for example, {CO(CH$_2$)$_4$CONH(CH$_2$)$_6$NH}$_n$ (wherein n represents an arbitrary number of repeating units) and, for example, n is preferably from 2 to 100, and more preferably from 3 to 50.

Moreover, the amide MX which has meta-xylene diamine as a structural unit can be represented by, for example, the following constituent unit (A-1) (in (A-1), n represents an arbitrary number of repeating units) and, for example, n is preferably from 2 to 100, and more preferably from 3 to 50.

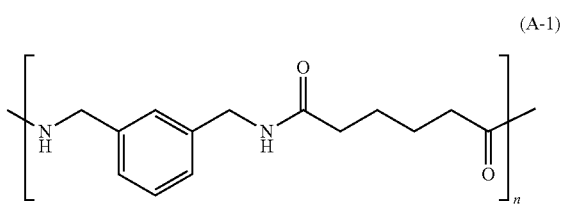

(A-1)

It is preferable that the polyamide-based thermoplastic elastomer has a polyamide (polyamide 12) having a unit structure represented by —[CO—(CH$_2$)$_{11}$—NH]—, as the hard segment. As described above, the polyamide 12 can be obtained by ring-opening polycondensation of lauryllactam or polycondensation of 12-aminododecanoic acid.

The number average molecular weight of the polymer (polyamide) that forms the hard segment is preferably from 300 to 15,000, from the viewpoints of melt moldability, toughness, and low temperature flexibility.

—Soft Segment—

Examples of the polymer that forms the soft segment (a polymer compound that forms the soft segment) include a polyester and a polyether, such as polyethylene glycol, polypropylene glycol, polytetramethylene ether glycol (PTMG), or an ABA-type triblock polyether. These may be used singly, or in combination of two or more kinds thereof.

Further, the polymer that forms the soft segment may be a polymer having a functional group introduced into the terminal thereof. The functional group may be any functional group that reacts with a terminal group of a compound (a polymer that forms the hard segment, a chain extending agent, or the like) which is to be allowed to react with the polymer that forms the soft segment. For example, in a case in which the terminal group of a compound which is to be allowed to react with the polymer that forms the soft segment is a carboxyl group, examples of the functional group include an amino group and the like.

Among the polymers that form soft segments, a polymer having amino groups introduced into the terminals thereof is, for example, a polyether diamine obtained by allowing the terminals of a polyether to react with ammonia. Specific examples thereof include an ABA-type triblock polyether diamine and the like.

Here, examples of the "ABA-type triblock polyether" may include a polyether represented by the following Formula (3).

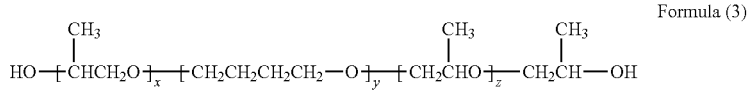

Formula (3)

In Formula (3), x and z each independently represent an integer of 1 to 20. y represents an integer of 4 to 50.

In Formula (3), x and z are each preferably an integer of 1 to 18, more preferably an integer of 1 to 16, particularly preferably an integer of 1 to 14, and most preferably an integer of 1 to 12. Further, in Formula (3), y is preferably an integer of 5 to 45, more preferably an integer of 6 to 40, particularly preferably an integer of 7 to 35, and most preferably an integer of 8 to 30.

In addition, the "ABA-type triblock polyether diamine" means a polyether diamine represented by the following Formula (N).

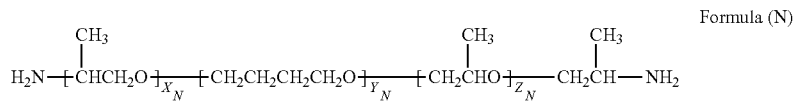

Formula (N)

In Formula (N), $X_N$ and $Z_N$ each independently represent an integer of 1 to 20. $Y_N$ represents an integer of 4 to 50.

In Formula (N), $X_N$ and $Z_N$ are each preferably an integer of 1 to 18, more preferably an integer of 1 to 16, particularly preferably an integer of 1 to 14, and most preferably an integer of 1 to 12. Further, in Formula (N), $Y_N$ is preferably an integer of 5 to 45, more preferably an integer of 6 to 40, particularly preferably an integer of 7 to 35, and most preferably an integer of 8 to 30.

The polymer that forms the soft segment may include a diamine such as a branched saturated diamine having from 6 to 22 carbon atoms, a branched alicyclic diamine having from 6 to 16 carbon atoms, or a norbornane diamine, as the monomer unit. These branched saturated diamine having from 6 to 22 carbon atoms, branched alicyclic diamine having from 6 to 16 carbon atoms, and norbornane diamine may be used singly or in a combination thereof, or may be used in combination with the ABA-type triblock polyether or the ABA-type triblock polyether diamine described above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane, and 2-methyl-1,8-diaminooctane.

Examples of the branched alicyclic diamine having from 6 to 16 carbon atoms may include 5-amino-2,2,4-trimethyl-1-cyclopentanemethylamine and 5-amino-1,3,3-trimethylcyclohexanemethylamine. These diamines may be any of a cis form or a trans form, or may be a mixture of these isomers.

Examples of the norbornane diamine include 2,5-norbornanedimethylamine, 2,6-norbornanedimethylamine, and mixtures thereof.

Moreover, the polymer that constitutes the soft segment may include an additional diamine compound other than the diamines described above, as the monomer unit. Examples of the additional diamine compound include aliphatic diamines such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylene diamine, 2,4,4-trimethylhexamethylene diamine, or 3-methylpentamethylene diamine; alicyclic diamines such as bis(4-aminocyclohexyl)methane, bis(4-aminocyclohexyl)propane, 1,3-bis(aminomethyl)cyclohexane, or 1,4-bis(aminomethyl)cyclohexane; and aromatic diamines such as meta-xylylene diamine or para-xylylene diamine.

The diamines described above may be used singly, or two or more kinds thereof may be used in an appropriate combination.

The number average molecular weight of the polymer that forms the soft segment is preferably from 200 to 6,000, more preferably from 400 to 4,000, and particularly preferably from 600 to 2,000, from the viewpoints of toughness and low temperature flexibility.

—Linking Portion—

As described above, the linking portion of the polyamide-based thermoplastic elastomer is, for example, a portion that is connected by a chain extending agent.

Examples of the chain extending agent include a dicarboxylic acid, a diol, and a diisocyanate. As the dicarboxylic acid, for example, at least one selected from the group consisting of aliphatic, alicyclic, and aromatic dicarboxylic acids, or a derivative thereof can be used. Examples of the diol include an aliphatic diol, an alicyclic diol, and an aromatic diol. As the diisocyanate, for example, an aromatic diisocyanate, an aliphatic diisocyanate, an alicyclic diisocyanate, or any mixture thereof can be used.

Specific examples of the dicarboxylic acid may include a straight chain aliphatic dicarboxylic acid having from 2 to 25 carbon atoms, such as adipic acid, decanedicarboxylic acid, oxalic acid, succinic acid, glutaric acid, pimelic acid, suberic acid, azelaic acid, sebacic acid, or dodecanedioic acid; an aliphatic dicarboxylic acid such as a dimerized aliphatic dicarboxylic acid having from 14 to 48 carbon atoms, which can be prepared by dimerization of unsaturated fatty acids obtained by fractional distillation of triglyceride, or a hydrogenated product thereof; an alicyclic dicarboxylic acid such as 1,4-cyclohexanedicarboxylic acid; and an aromatic dicarboxylic acid such as terephthalic acid or isophthalic acid. Above all, dodecanedioic acid, eicosanedioic acid, phenylenediacetic acid, terephthalic acid, and adipic acid are preferable.

Specific examples of the diisocyanate may include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylene diisocyanate, isophorone diisocyanate, 4,4'-dicyclohexylmethane diisocyanate, methylcyclohexane diisocyanate, tetramethylxylylene diisocyanate, 2,6-diisopropylphenyl isocyanate, and 1,3,5-triisopropylbenzene-2,4-diisocyanate. Above all, an aromatic diisocyanate is preferable, and 4,4'-dipenylmethane diisocyanate is more preferable.

Specific examples of the diol include ethylene glycol, diethylene glycol, triethylene glycol, propylene glycol, butanediol, hexanediol, neopentyl glycol, cyclohexanediol, cyclohexanedimethanol, hydrogenated bisphenol A, an ethylene oxide adduct of bisphenol A, and a propylene oxide adduct of bisphenol A. Above all, an aliphatic diol is preferable, and butanediol is more preferable.

—Molecular Weight—

The number average molecular weight of the polyamide-based thermoplastic elastomer is, for example, from 15,700 to 200,000. When the number average molecular weight of the polyamide-based thermoplastic elastomer is less than 15,700, fittability to a rim may be deteriorated. Further, when the number average molecular weight of the polyamide-based thermoplastic elastomer exceeds 200,000, the melt viscosity is increased and there are cases in which it is necessary to raise the molding temperature and the temperature of the mold in order to prevent shortage of filling at the time of forming the tire frame. However, in a case in which the molding temperature and the temperature of the mold are raised in order to prevent shortage of filling, the cycle time becomes long, and thus, the productivity is inferior.

The number average molecular weight of the polyamide-based thermoplastic elastomer is preferably from 20,000 to 160,000. The number average molecular weight of the polyamide-based thermoplastic elastomer can be measured by gel permeation chromatography (GPC) and, for example, a GPC (gel permeation chromatography) such as "HLC-8320GPC ECO SEC" (trade name, manufactured by Tosoh Corporation) can be used. The same applies to the measurement of the number average molecular weight of other thermoplastic elastomers described below.

In the polyamide-based thermoplastic elastomer, a ratio (x/y) of a mass of the hard segment (x) to a mass of the soft segment (y) is preferably from 30/70 to 80/20, and more preferably from 50/50 to 75/25, from the viewpoint of ensuring stiffness as a tire and from the viewpoint of enabling fitting onto a rim.

The content of the hard segment in the polyamide-based thermoplastic elastomer is preferably from 5% by mass to 95% by mass, more preferably from 10% by mass to 90% by mass, and particularly preferably from 15% by mass to 90% by mass, with respect to the total amount of the polyamide-based thermoplastic elastomer.

The content of the soft segment in the polyamide-based thermoplastic elastomer is preferably from 10% by mass to 95% by mass, more preferably from 10% by mass to 90% by mass, and particularly preferably from 10% by mass to 90% by mass, with respect to the total amount of the polyamide-based thermoplastic elastomer.

In the case of using the chain extending agent, the content of the chain extending agent is preferably determined such that the functional group (for example, a hydroxyl group or an amino group) at the terminals of the polymer that forms the soft segment and the carboxyl group of the chain extending agent are almost in equimolecular amounts.

—Production Method—

The polyamide-based thermoplastic elastomer can be synthesized by copolymerizing a polymer that forms the hard segment and a polymer that forms the soft segment, according to a known method.

For example, the polyamide-based thermoplastic elastomer can be obtained as follows. Namely, polymerization is conducted, in a container, using a monomer that constitutes the hard segment (for example, an ω-aminocarboxylic acid such as 12-aminododecanoic acid, or a lactam such as lauryllactam) and a chain extending agent (for example, adipic acid or dodecanedicarboxylic acid), and then, a polymer that constitutes the soft segment (for example, polypropylene glycol, an ABA-type triblock polyether, a diamine obtained by modifying the terminals of the above polymer into amino groups, or the like) is added, and the resulting mixture is further allowed to undergo polymerization, whereby a polyamide-based thermoplastic elastomer can be obtained.

Particularly, in a case in which an ω-aminocarboxylic acid is used as the monomer that constitutes the hard segment, a polyamide-based thermoplastic elastomer can be synthesized by carrying out melt polymerization under atmospheric pressure, or by a method including melt polymerization under atmospheric pressure and subsequent melt polymerization under reduced pressure. In a case in which a lactam is used as the monomer that constitutes the hard segment, a polyamide-based thermoplastic elastomer can be produced by a method including, in the presence of an appropriate amount of water, melt polymerization under pressure of from 0.1 MPa to 5 MPa and subsequent melt polymerization under atmospheric pressure and/or melt polymerization under reduced pressure. Further, the above synthesis reactions can be carried out by a batch system or a continuous system. Moreover, for the synthesis reaction described above, a batch type reaction vessel, a single-tank type or multi-tank type continuous reactor, a tubular continuous reactor, and the like may be used singly, or in an appropriate combination thereof.

In the production of the polyamide-based thermoplastic elastomer, the polymerization temperature is preferably from 150° C. to 300° C., and more preferably from 160° C. to 280° C. Further, the polymerization time can be determined as appropriate based on the weight average molecular weight of the polyamide-based thermoplastic elastomer to be synthesized and the polymerization temperature. For example, the polymerization time is preferably from 0.5 hours to 30 hours, and more preferably from 0.5 hours to 20 hours.

In the production of the polyamide-based thermoplastic elastomer, if necessary, an additive, for example, a monoamine or a diamine, such as lauryl amine, stearylamine, hexamethylenediamine, or meta-xylylene diamine; a monocarboxylic acid or a dicarboxylic acid, such as acetic acid, benzoic acid, stearic acid, adipic acid, sebacic acid, or dodecanedioic acid; or the like; may be added, for the purpose of adjusting the molecular weight or stabilizing the melt viscosity at the time of fabrication. These additives can be selected as appropriate, based on the molecular weight or the viscosity of the polyamide-based thermoplastic elastomer to be obtained or the like, within a range that does not exert adverse influence on the effects of the invention.

Further, in the production of the polyamide-based thermoplastic elastomer, a catalyst can be used, if necessary. Examples of the catalyst include compounds containing at least one kind selected from the group consisting of P, Ti, Ge, Zn, Fe, Sn, Mn, Co, Zr, V, Ir, La, Ce, Li, Ca, and Hf.

Examples thereof include an inorganic phosphorous compound, an organic titanium compound, an organic zirconium compound, and an organic tin compound.

Specific examples of the inorganic phosphorus compound include a phosphorous-containing acid such as phosphoric acid, diphosphoric acid, polyphosphoric acid, phosphorous acid, or phosphinic acid; an alkaline metal salt of a phosphorus-containing acid; and an alkaline earth metal salt of a phosphorus-containing acid.

Examples of the organic titanium compound include titanium alkoxides (titanium tetrabutoxide, titanium tetraisopropoxide, and the like).

Examples of the organic zirconium compound include zirconium alkoxides (zirconium tetrabutoxide (also called "Zr(OBu)$_4$" or "Zr(OC$_4$H$_8$)$_4$") and the like).

Examples of the organic tin compound include distannoxane compounds (1-hydroxy-3-(isothiocyanato)-1,1,3,3-tetrabutyldistannoxane and the like), tin acetate, dibutyltin dilaurate, and butyltin hydroxide oxide hydrate.

The addition amount of the catalyst and the time to add the catalyst are not particularly limited, as long as the objected substance can be obtained quickly under these conditions.

As the polyamide-based thermoplastic elastomer, for example, a combination of a ring-opening polycondensation product of lauryllactam/polyethylene glycol/adipic acid, a combination of a ring-opening polycondensation product of lauryllactam/polypropylene glycol/adipic acid, a combination of a ring-opening polycondensation product of lauryllactam/polytetramethylene ether glycol/adipic acid, a combination of a ring-opening polycondensation product of lauryllactam/an ABA-type triblock polyether/adipic acid, a combination of a ring-opening polycondensation product of lauryllactam/an ABA-type triblock polyether diamine/adipic acid, a combination of a ring-opening polycondensation product of lauryllactam/polyethylene glycol/decanedicarboxylic acid, a combination of a ring-opening polycondensation product of lauryllactam/polypropylene glycol/decanedicarboxylic acid, a combination of a ring-opening polycondensation product of lauryllactam/polytetramethylene ether glycol/decanedicarboxylic acid, a combination of a ring-opening polycondensation product of lauryllactam/an ABA-type triblock polyether/decanedicarboxylic acid, a combination of a ring-opening polycondensation product of lauryllactam/an ABA-type triblock polyether diamine/decanedicarboxylic acid, a combination of a polycondensation product of aminododecanoic acid/polyethylene glycol/adipic acid, a combination of a polycondensation product of aminododecanoic acid/polypropylene glycol/adipic acid, a combination of a polycondensation product of aminododecanoic acid/polytetramethylene ether glycol/adipic acid, a combination of a polycondensation product of aminododecanoic acid/an ABA-type triblock polyether/adipic acid, a combination of a polycondensation product of aminododecanoic acid/an ABA-type triblock polyether diamine/adipic acid, a combination of a polycondensation product of aminododecanoic acid/polyethylene glycol/decanedicarboxylic acid, a combination of a polycondensation product of aminododecanoic acid/polypropylene glycol/decanedicarboxylic acid, a combination of a polycondensation product of aminododecanoic acid/polytetramethylene ether glycol/decanedicarboxylic acid, a combination of a polycondensation product of aminododecanoic acid/an ABA-type triblock polyether/decanedicarboxylic acid, and a combination of a polycondensation product of aminododecanoic acid/an ABA-type triblock polyether diamine/decanedicarboxylic acid are preferable. A combination of a ring-opening polycondensation product of lauryllactam/an ABA-type triblock polyether/adipic acid, a combination of a polycondensation product of aminododecanoic acid/an ABA-type triblock polyether/adipic acid, a combination of a polycondensation product of aminododecanoic acid/an ABA-type triblock polyether diamine/decanedicarboxylic acid, a combination of a polycondensation product of aminododecanoic acid/polytetramethylene ether glycol/adipic acid, and a combination of a polycondensation product of aminododecanoic acid/polytetramethylene ether glycol/decanedicarboxylic acid are particularly preferable. As the polyamide-based thermoplastic elastomer, the preferable modes described above may be used in combination, considering the combination of the constituent units, the constituent ratio thereof, the molecular weight, and the like.

—Specific Polymer—

In the case of using the polyamide-based thermoplastic elastomer as the thermoplastic elastomer, the specific polymer is a polymer having the same structural unit as that of the soft segment of the polyamide-based thermoplastic elastomer.

Specifically, for example, in a case in which an "ABA-type triblock polyether diamine" represented by Formula (N) above is used as the polymer that forms the soft segment, examples of the specific polymer include an ABA-type triblock copolymer represented by the following Formula (M).

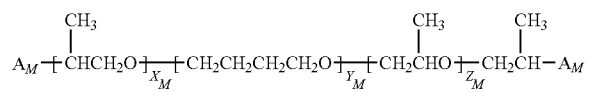

Formula (M)

In Formula (M), each of $X_M$ and $Z_M$ independently represents an integer of 1 to 20. $Y_M$ represents an integer of 4 to 50. Each $A_M$ independently represents an amino group, an amido group, a proton group, an imino group, a carboxyl group, or an aldehyde group.

Note that, $X_M$, $Y_M$, and $Z_M$ in Formula (M) may be the same as or different from $X_N$, $Y_N$, and $Z_N$ in Formula (N), respectively.

The number average molecular weight of the ABA-type triblock copolymer represented by Formula (M) is preferably from 0.3 times to 6 times the number average molecular weight of the ABA-type triblock polyether diamine represented by Formula (N), more preferably from 0.6 times to 3 times, and still more preferably from 0.9 times to 1.1 times.

<Case of Using Polyester-Based Thermoplastic Elastomer>

In the present specification, the "polyester-based thermoplastic elastomer" refers to a thermoplastic elastomer that is formed of a copolymer having a polymer constituting a hard segment that is crystalline and has a high melting temperature and a polymer constituting a soft segment that is non-crystalline and has a low glass transition temperature, wherein the polymer constituting the hard segment has ester bonds (—COO—) in the main chain thereof.

Examples of the polyester-based thermoplastic elastomer include a material in which at least a polyester constitutes a crystalline hard segment having a high melting temperature and another polymer (for example, a polyester, a polyether, or the like) constitutes a non-crystalline soft segment having a low glass transition temperature.

—Hard Segment—

As a crystalline polyester that forms the hard segment in the polyester-based thermoplastic elastomer, an aromatic polyester can be used. An aromatic polyester can be formed from, for example, an aromatic dicarboxylic acid or an ester-forming derivative thereof and an aliphatic diol.

Examples of the aromatic polyester that forms the hard segment include polyethylene terephthalate, polybutylene terephthalate, polystyrene terephthalate, polyethylene naphthalate, and polybutylene naphthalate. Polybutylene terephthalate is preferable.

Preferable examples of the aromatic polyester that forms the hard segment include a polybutylene terephthalate derived from at least one of terephthalic acid or dimethyl terephthalate and 1,4-butanediol. Preferable examples of the aromatic polyester that forms the hard segment further include a polyester derived from a dicarboxylic acid component, such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof, and a diol component having a molecular weight of 300 or less [for example, an aliphatic diol such as ethylene glycol, trimethylene glycol, pentamethylene glycol, hexamethylene glycol, neopentyl glycol, or decamethylene glycol; an alicyclic diol such as 1,4-cyclohexanedimethanol or tricyclodecanedimethylol; an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quarterphenyl; or the like], and a copolymer polyester that is obtained by using two or more of the above dicarboxylic acid components and/or two or more of the above diol components in combination. Moreover, preferable examples of the aromatic polyester that forms the hard segment further include a copolymerization product obtained by using a polyfunctional carboxylic acid component, a polyfunctional oxyacid component, a polyfunctional hydroxy component, or the like, each of which has a functionality of 3 or higher, in an amount in the range of 5 mol % or less with respect to the whole aromatic polyester.

The number average molecular weight of the polymer (polyester) that forms the hard segment is preferably from 300 to 6,000, from the viewpoints of toughness and low temperature flexibility.

—Soft Segment—

Examples of the polymer that forms the soft segment include a polymer selected from an aliphatic polyester or an aliphatic polyether.

Examples of the aliphatic polyether include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide adduct polymer of poly(propylene oxide) glycol, and a copolymer of ethylene oxide and tetrahydrofuran.

Examples of the aliphatic polyester include poly(ε-caprolactone), polyenantholactone, polycaprylolactone, polybutylene adipate, and polyethylene adipate.

Among these aliphatic polyethers and aliphatic polyesters, poly(tetramethylene oxide) glycol, an ethylene oxide adduct of poly(propylene oxide) glycol, poly(ε-caprolactone), polybutylene adipate, polyethylene adipate, and the like are preferable, from the viewpoint of the elastic characteristics of the resulting copolymer.

The number average molecular weight of the polymer that forms the soft segment is preferably from 300 to 6,000, from the viewpoints of toughness and low temperature flexibility.

—Linking Portion—

The linking portion is, for example, a portion that is connected by a chain extending agent. Examples of the chain extending agent include those described above in the polyamide-based thermoplastic elastomer. From the viewpoint of reactivity, the chain extending agent of the polyester-based thermoplastic elastomer is preferably an aliphatic dicarboxylic acid, an alicyclic dicarboxylic acid, or an aromatic dicarboxylic acid.

—Molecular Weight—

The number average molecular weight of the polyester-based thermoplastic elastomer is, for example, from 15,700 to 200,000, and more preferably from 20,000 to 200,000, from the viewpoints of fittability to a rim and productivity.

A ratio (x/y) of a mass of the hard segment (x) to a mass of the soft segment (y) is preferably from 30/70 to 80/20, and more preferably from 50/50 to 75/25, from the viewpoint of ensuring stiffness as a tire and from the viewpoint of enabling fitting onto a rim.

—Production Method—

The polyester-based thermoplastic elastomer can be synthesized by copolymerizing a polymer that forms the hard segment and a polymer that forms the soft segment, according to a known method.

A commercially available product can be used as the polyester-based thermoplastic elastomer. For example, "HYTREL" series (for example, 3046, 5557, 6347, 4047, and 4767) manufactured by DU PONT-TORAY CO., LTD., "PELPRENE" series (for example, P30B, P40B, P4OH, P55B, P70B, P150B, P250B, E450B, P150M, S1001, S2001, S5001, S6001, and S9001) manufactured by TOYOBO CO., LTD., or the like can be used.

—Specific Polymer—

In the case of using the polyester-based thermoplastic elastomer as the thermoplastic elastomer, the specific polymer is a polymer having the same structural unit as that of the soft segment of the polyester-based thermoplastic elastomer.

Specifically, for example, in a case in which poly(tetramethylene oxide) glycol is used as the polymer that forms the soft segment, examples of the specific polymer include poly(tetramethylene oxide) glycol.

<Case of Using Polyurethane-Based Thermoplastic Elastomer>

Examples of the polyurethane-based thermoplastic elastomer include a material in which at least a polyurethane constitutes a hard segment forming a pseudo-crosslinking by physical aggregation and another polymer constitutes a soft segment that is non-crystalline and has a low glass transition temperature. The polyurethane-based thermoplastic elastomer can be represented as a copolymer including, for example, a soft segment containing a unit structure represented by the following Formula A and a hard segment containing a unit structure represented by the following Formula B.

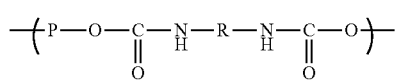

Formula A

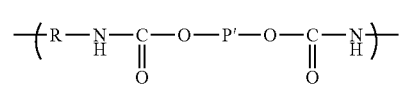

Formula B

—Soft Segment—

In Formula A, P represents a long-chain aliphatic polyether or a long-chain aliphatic polyester. In Formula A and Formula B, R represents an aliphatic hydrocarbon, an alicyclic hydrocarbon, or an aromatic hydrocarbon. In Formula B, P' represents a short-chain aliphatic hydrocarbon, an alicyclic hydrocarbon, or an aromatic hydrocarbon.

As the long-chain aliphatic polyether and long-chain aliphatic polyester represented by P in Formula A, for example, those having a molecular weight of from 500 to 5,000 can be used. P is derived from a diol compound containing the long-chain aliphatic polyether and long-chain aliphatic polyester represented by P. Examples of such a diol compound include polyethylene glycol, polypropylene glycol, polytetramethylene ether glycol, poly(butylene adipate) diol, poly-ε-caprolactone diol, poly(hexamethylene carbonate) diol, and the ABA-type triblock polyether described above, each of which has a molecular weight within the above range.

These may be used singly, or in combination of two or more kinds thereof.

In Formula A, R is derived from a diisocyanate compound containing the aliphatic hydrocarbon, alicyclic hydrocarbon, or aromatic hydrocarbon represented by R. Examples of an aliphatic diisocyanate compound containing the aliphatic hydrocarbon represented by R include 1,2-ethylene diisocyanate, 1,3-propylene diisocyanate, 1,4-butane diisocyanate, and 1,6-hexamethylene diisocyanate.

Examples of a diisocyanate compound containing the alicyclic hydrocarbon represented by R include 1,4-cyclohexane diisocyanate and 4,4-cyclohexane diisocyanate. Examples of an aromatic diisocyanate compound containing the aromatic hydrocarbon represented by R include 4,4'-diphenylmethane diisocyanate and tolylene diisocyanate.

These may be used singly, or in combination of two or more kinds thereof.

The number average molecular weight of the polymer that constitutes the soft segment is preferably from 500 to 20,000, more preferably from 500 to 5,000, and particularly preferably from 500 to 3,000, from the viewpoints of flexibility and thermal stability of the polyurethane-based thermoplastic elastomer.

—Hard Segment—

In Formula B, as the short-chain aliphatic hydrocarbon, alicyclic hydrocarbon, or aromatic hydrocarbon represented by P', for example, those having a molecular weight of less than 500 can be used. P' is derived from a diol compound containing the short-chain aliphatic hydrocarbon, alicyclic hydrocarbon, or aromatic hydrocarbon represented by P'. Examples of an aliphatic diol compound containing the short-chain aliphatic hydrocarbon represented by P' include glycols and polyalkylene glycols, such as ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol and 1,10-decanediol.

Examples of an alicyclic diol compound containing the alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Examples of an aromatic diol compound containing the aromatic hydrocarbon represented by P' include hydroquinone, resorcin, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenylsulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These may be used singly, or in combination of two or more kinds thereof.

R in Formula B has the same definition as R in Formula A.

The number average molecular weight of the polymer (polyurethane) that forms the hard segment is preferably from 300 to 1,500, from the viewpoint of melt moldability.

—Linking Portion—

The linking portion is, for example, a portion that is connected by a chain extending agent. Examples of the chain extending agent include those described above in the polyamide-based thermoplastic elastomer. From the viewpoint of reactivity, preferable examples of the chain extending agent of the polyurethane-based thermoplastic elastomer include an aliphatic diol, an alicyclic diol, and an aromatic diol.

—Molecular Weight—

The number average molecular weight of the polyurethane-based thermoplastic elastomer is, for example, from 15,700 to 200,000, and preferably from 20,000 to 200,000, from the viewpoints of fittability to a rim and productivity.

A ratio (x/y) of a mass of the hard segment (x) to a mass of the soft segment (y) is preferably from 30/70 to 80/20, and more preferably from 50/50 to 75/25, from the viewpoint of ensuring stiffness as a tire and from the viewpoint of enabling fitting onto a rim.

—Production Method—

The polyurethane-based thermoplastic elastomer can be synthesized by copolymerizing a polymer that forms the hard segment and a polymer that forms the soft segment, according to a known method. As the polyurethane-based thermoplastic elastomer, for example, a thermoplastic polyurethane described in JP-A No. H5-331256 can be used.

Specifically, the polyurethane-based thermoplastic elastomer is preferably a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenylmethane diisocyanate (MDI)/polyester-based polyol copolymer, an MDI/polyether-based polyol copolymer, an MDI/caprolactone-based polyol copolymer, or an MDI/polycarbonate-based polyol copolymer. TDI and polyester-based polyol, TDI and polyether-based polyol, MDI and polyester polyol, and MDI and polyether-based polyol are more preferable.

As the polyurethane-based thermoplastic elastomer, for example, a commercially available product such as "ELASTRAN" series (for example, ET680, ET880, ET690, ET890, and the like) manufactured by BASF Co., Ltd., "KURAMIRON U" series (for example, 2000s, 3000s, 8000s, and 9000s) manufactured by Kuraray Co., Ltd., "MIRACTRAN" series (for example, XN-2001, XN-2004, P390RSUP, P480RSUI, P26MRNAT, E490, E590, and P890) manufactured by Nippon Miractran Co., Ltd., or the like can be used.

—Specific Polymer—

In the case of using the polyurethane-based thermoplastic elastomer as the thermoplastic elastomer, the specific polymer is a polymer having the same structural unit as that of the soft segment of the polyurethane-based thermoplastic elastomer.

Specifically, for example, in a case in which a polymer containing a unit structure represented by Formula A above is used as the polymer that forms the soft segment, examples of the specific polymer include a polymer containing a unit structure represented by Formula A above.

In the resin material, as desired, various additives such as rubber, various fillers (for example, silica, calcium carbonate, or clay), an aging inhibitor, an oil, a plasticizer, a colorant, a weather-proofing agent, or a reinforcing material may be incorporated. The content of the additives in the resin material (tire frame) is not particularly limited, and the additives can be appropriately used, as long as the effects of the invention are not impaired. In the case of adding components other than the resin, such as additives, to the resin material, the content of the resin component in the resin material is preferably 50% by mass or higher, and more preferably 90% by mass or higher, with respect to the total amount of the resin material. Here, the content of the resin component in the resin material indicates the residue obtained by subtracting the total content of the additives from the total amount of the resin material.

(Physical Properties of Resin Material)

Next, preferable physical properties of the resin material that constitutes the tire frame are explained. The tire frame is formed by using the resin material described above.

The melting temperature (or softening temperature) of the resin material (tire frame) itself is normally from 100° C. to 350° C., is preferably from approximately 100° C. to approximately 250° C., and from the viewpoint of manufacturability of the tire, is preferably from approximately 120° C. to approximately 250° C., and is more preferably from 150° C. to 250° C.

When, for example, a frame of a tire is formed by welding together divided bodies (frame pieces), by using a resin material with a melting temperature of from 120° C. to 250° C. in this manner achieves sufficient strength of bonding of the tire frame pieces together even for a frame welded in an ambient temperature range of from 120° C. to 250° C. The tire accordingly has excellent durability during running, such as puncture resistance and abrasion resistance properties. The heating temperature is preferably a temperature that is from 10° C. to 150° C. higher, and is more preferably a temperature from 10° C. to 100° C. higher, than the melting temperature (or softening temperature) of the resin material forming the tire frame pieces.

The resin material may be obtained by adding various additives if necessary, and mixing as appropriate using a known method (for example melt mixing).

A resin material obtained by melt mixing may be employed in a pellet form, if necessary.

The resin material (the tire frame) itself has a tensile yield strength as defined in JIS K7113:1995 of equal to or higher than 5 MPa, more preferably 5 MPa to 20 MPa, and still more preferably 5 MPa to 17 MPa. When the tensile yield strength of the resin material is equal to or higher than 5 MPa, resistance to deformation caused by a load applied to a tire during traveling or the like can be achieved.

The resin material (the tire frame) itself preferably has a tensile yield elongation as defined in JIS K7113:1995 of equal to or higher than 10%, more preferably 10% to 70%, and still more preferably 15% to 60%. When the tensile yield elongation of the resin material is equal to or higher than 10%, the elastic region is large, and the air sealing property is improved.

The resin material (the tire frame) itself preferably has a tensile elongation at break as defined in JIS K7113:1995 of equal to or higher than 50%, more preferably equal to or higher than 100%, still more preferably equal to or higher than 150%, and particularly preferably equal to or higher than 200%. When the tensile elongation at break of the resin material is equal to or higher than 50%, fittability onto a rim is excellent, and resistance to breaking at collision can be obtained.

The resin material (the tire frame) itself preferably has a deflection temperature under load (under a load of 0.45 MPa) as defined in ISO 75-2 or ASTM D648 of equal to or higher than 50° C., more preferably 50° C. to 180° C., and still more preferably 70° C. to 180° C. When the deflection temperature under load of the resin material is equal to or higher than 50° C., deformation of a tire frame can be suppressed even in cases in which vulcanization is performed during the production of a tire.

Embodiment 1

Embodiment 1 of the tire of the invention will be described below with reference to the drawings.

Figure 1B:
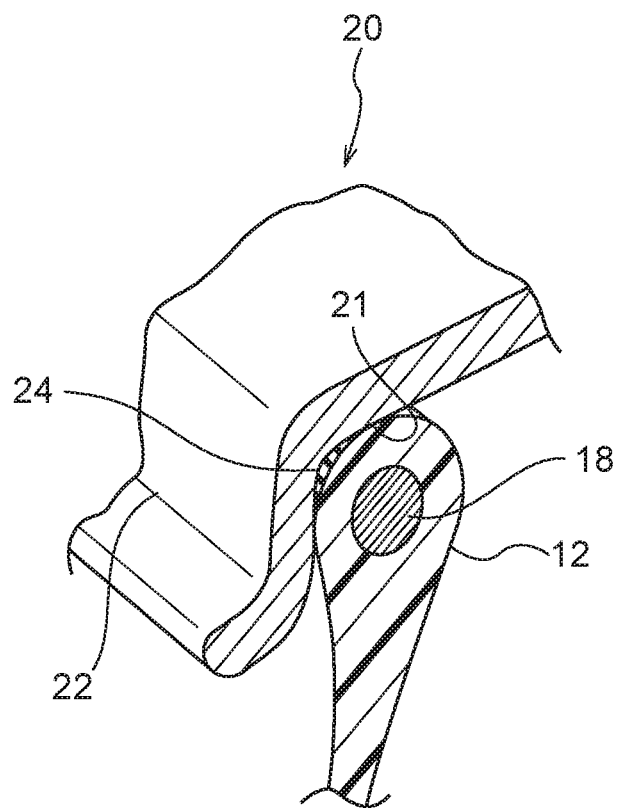
FIG. 1B is a cross-sectional view of a bead portion fitted to a rim.

A tire 10 according to this embodiment will be described below. FIG. 1A is a perspective view illustrating a cross-section of a part of a tire according to one embodiment of the invention. FIG. 1B is a cross-sectional view of a bead portion fitted to a rim. As shown in FIG. 1A, the tire 10 according to this embodiment has substantially the same cross-sectional shape as those of conventional general rubber pneumatic tires.

As shown in FIG. 1A, the tire 10 is equipped with a tire case 17 (tire frame) including: a pair of bead portions 12 each contacting with a bead seat 21 and a rim flange 22 of a rim 20 shown in FIG. 1B; side portions 14 that extend from the bead portions 12 toward the outer side in the tire radial direction; and a crown portion 16 (outer peripheral portion) that connects the outer end in the tire radial direction of one side portion 14 and the outer end in the tire radial direction of the other side portion 14.

Here, in the tire case 17 of the present embodiment, a resin material including, for example, a thermoplastic elastomer having a hard segment and a soft segment, a polymer having the same structural unit as that of the soft segment, and additives can be used.

The tire case 17 of the present embodiment is formed with a single resin material; however, the configuration of the invention is not limited thereto, and, similarly to ordinary conventional rubber-made pneumatic tires, thermoplastic resin materials with different characteristics may be employed for each of the sections of the tire case 17 (such as the side portions 14, the crown portion 16 and the bead portions 12). The tire case 17 may be reinforced by a reinforcing material by embedding the reinforcing material (such as fibers, cord, nonwoven fabric, or woven fabric of a polymer material or metal) in the tire case 17 (for example, in the bead portions 12, the side portions 14, the crown portion 16, and the like).

The tire case 17 according to the present embodiment is formed by bonding a pair of tire case half parts (tire frame pieces) 17A formed of a resin material to each other. The tire case half parts 17A is formed by placing circular tire case half parts 17A that have the same shape and that are obtained by molding one bead portion 12, one side portion 14, and a half-width of the crown portion 16 as an integral body by injection molding or the like, to face each other, and bonding the half parts to each other at the tire equatorial plane portion. The tire case 17 is not limited to that obtained by bonding two members, and may be formed by bonding three or more members.

Each tire case half part 17A formed of the resin material can be molded by, for example, vacuum molding, pressure molding, injection molding, or melt casting. Accordingly, when compared with a conventional case in which the tire case is molded from rubber, it is not necessary to perform vulcanization, as a result of which the production process can remarkably be simplified, and the molding time can be saved.

In the present embodiment, the tire case half parts 17A have a symmetric shape, that is, one tire case half part 17A and the other tire case half part 17A have the same shape; therefore, there is an advantage in that the tire case half parts 17A can be molded using only one type of mold.

In the present embodiment, as shown in FIG. 1B, an annular bead core 18 formed of a steel cord is embedded in each bead portion 12, similarly to conventional general pneumatic tire. However, the invention is not limited to this configuration; the bead core 18 may be omitted as long as the rigidity of the bead portions 12 is ensured and there is no problem in fitting to the rim 20. Other than the steel cord, the bead core may be formed of an organic fiber cord, a resin-coated organic fiber cord, a hard resin, or the like.

In the present embodiment, an annular sealing layer 24 formed of a material having higher sealing properties than those of the resin material constituting the tire case 17, for example rubber, is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resin material that constitutes the tire case 17 may be used as the material having higher sealing properties than those of the resin material that constitutes the tire case 17. It is preferable to use, as a rubber usable for the sealing layer 24, the same kind of rubber as a rubber used on the outer surface of a bead portion of a conventional general rubber pneumatic tire. Other thermoplastic resins (thermoplastic elastomers) having higher sealing properties than those of the resin material may be used. Examples of other thermoplastic resins include resins such as a polyurethane-based resin, a polyolefin-based resin, a polystyrene-based thermoplastic resin, and a polyester resin, and a blend of any of these resins with a rubber or an elastomer. Thermoplastic elastomers can also be used, and examples thereof include a polyester-based thermoplastic elastomer, a polyurethane-based thermoplastic elastomer, a polystyrene-based thermoplastic elastomer, and a polyolefin-based thermoplastic elastomer, and any combination of these elastomers and a blend of any of these elastomers with a rubber.

As shown in FIG. 1A, in the crown portion 16, a reinforcing cord 26 having higher rigidity than that of the resin material constituting the tire case 17 is wound in the circumferential direction of the tire case 17. The reinforcing cord 26 is helically wound to form a reinforcing cord layer 28 in a state in which at least a part of the reinforcing cord 26 is embedded in the crown portion 16 in a cross-sectional view taken along the axial direction of the tire case 17. A tread 30 formed of a material, such as rubber, having higher abrasion resistance than that of the resin material constituting the tire case 17 is disposed on the outer circumference side in the tire radial direction of the reinforcing cord layer 28.

Figure 2:
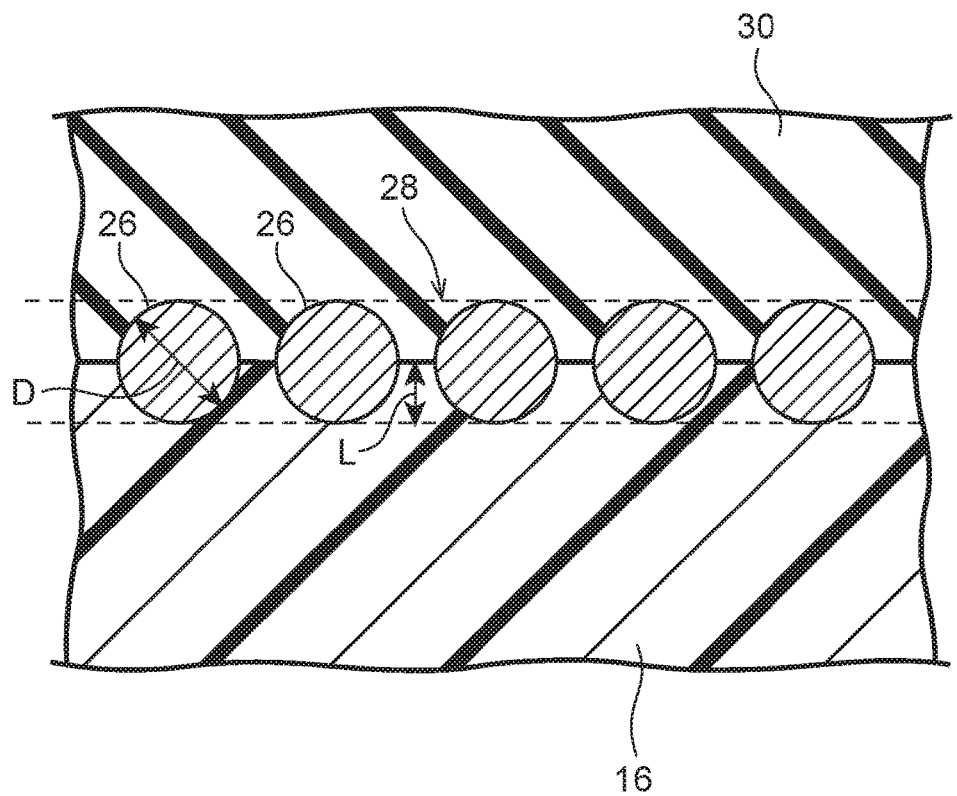
FIG. 2 is a cross-sectional view taken along a tire rotation axis that illustrates a state in which a reinforcing cord is embedded in a crown portion of a tire case of a tire according to a first embodiment.

The reinforcing cord layer 28 formed by the reinforcing cord 26 will be described below with reference to FIG. 2. FIG. 2 is a cross-sectional view taken along the tire rotation axis, which illustrates a state in which the reinforcing cord is embedded in the crown portion of the tire case of the tire according to Embodiment 1. As shown in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 specified by the dotted lines in FIG. 2. The part of the reinforcing cord 26 that is embedded in the crown portion 16 is in close contact with the resin material constituting the crown portion 16 (the tire case 17). A monofilament (single filament) of a metal fiber, an organic fiber, or the like, or a multifilament (stranded filament) in which fibers are stranded, such as a steel cord composed of steel fibers, may be used as the reinforcing cord 26. In the present embodiment, a steel cord is used as the reinforcing cord 26.

The embedding depth L in FIG. 2 represents the depth of embedding of the reinforcing cord 26 in the tire case 17 (the crown portion 16) in the tire rotation axis direction. The depth of embedding L of the reinforcing cord 26 in the crown portion 16 is preferably equal to or greater than ⅕ of the diameter D of the reinforcing cord 26, and more preferably more than ½ of the diameter D of the reinforcing cord 26. It is most preferable that the entire reinforcing cord 26 be embedded in the crown portion 16. When the depth of embedding L of the reinforcing cord 26 is more than ½ of the diameter D of the reinforcing cord 26, the reinforcing cord 26 is difficult to drop off from the embedded portion due to the dimensions of the reinforcing cord 26. When the reinforcing cord 26 is entirely embedded in the crown portion 16, the surface (the outer circumferential surface) becomes flat, whereby entry of air into an area around the reinforcing cord can be suppressed even when a member is placed on the crown portion 16 in which the reinforcing cord 26 is embedded. The reinforcing cord layer 28 corresponds to a belt disposed on the outer circumferential surface of a carcass of a conventional rubber pneumatic tire.

As described above, the tread 30 is disposed on the outer circumferential side in the tire radial direction of the reinforcing cord layer 28. It is preferable that the same kind of rubber as that used for conventional rubber pneumatic tires is used as the rubber used for the tread 30. It is also possible to use, instead of the tread 30, a tread formed of another kind of resin material which has higher abrasion resistance than that of the resin material constituting the tire case 17. In the tread 30, a tread pattern composed of plural grooves is formed on the contact surface that comes into contact with a road surface, similarly to conventional rubber pneumatic tires.

A method of producing a tire of the invention will be described below.

(Tire Case Forming Step)

First, tire case half parts are formed by using the resin material including a resin composition containing the thermoplastic resin elastomer. It is preferable to form the tire case by injection molding. Next tire case half parts supported by thin metal support rings are arranged to face each other. Subsequently, a mold for bonding, which is not shown in the drawings, is placed so as to contact the outer circumferential surface of a portion at which the tire case half parts are contacted with each other. Here, the mold for bonding is configured to pressurize a region at or around the bonding section (the contact portion) of the tire case half parts 17A with a predetermined pressure. Then, the region at or around the bonding section of the tire case half parts is pressurized at a temperature equal to or higher than the melting temperature (or the softening temperature) of the resin material that constitutes the tire case. When the bonding section of the tire case half parts is heated and pressurized by the mold for bonding, the bonding section is melted, and the tire case half parts are fused with each other, as a result of which the members are integrated to form the tire case 17. Although the bonding section of the tire case half parts is heated using the mold for bonding in the present embodiment, the invention is not limited to this configuration; heating of the bonding section may be carried out using, for example, a separately-provided high-frequency heater, or the tire case half parts may be bonded by softening or melting the bonding section, in advance, via application of hot air, irradiation of infrared rays or the like, and pressurizing the bonding section using the mold for bonding.

(Reinforcing Cord Member Winding Step)

Next, although illustration is omitted, using a cord feeding apparatus equipped with a reel on which a reinforcing cord 26 is wound, a cord heating device, and rollers, a reinforcing cord layer 28 can be formed on the outer circumferential side of the crown portion 16 of the tire case 17, by winding a heated reinforcing cord 26 on the outer circumferential surface of the crown portion 16 such that the heated reinforcing cord is embedded in the outer circumferential surface of the crown portion.

In this way, a reinforcing cord layer 28 is formed on the outer circumference side of the crown portion 16 of the tire case 17 by winding a heated reinforcing cord 26 on the outer circumferential surface of the crown portion 16 such that the heated reinforcing cord is embedded in the outer circumferential surface of the crown portion.

Next, a belt-shaped tread 30 that has been vulcanized is wound on the outer circumferential surface of the tire case 17 for one revolution, and the tread 30 is bonded to the outer circumferential surface of the tire case 17 using, for example, an adhesive. Note that, as the tread 30, for example, a precured tread conventionally known for use in retreaded tires may be used. This step is a step similar to a step of bonding a precured tread to the outer circumferential surface of a casing of a retreaded tire.

A tire 10 can be completed by bonding a sealing layer 24 formed of a vulcanized rubber to the bead portion 12 of the tire case 17 using, for example, an adhesive.

(Effects)

In the tire 10 of the present embodiment, the tire case 17 is formed of a resin material including a thermoplastic elastomer having a hard segment and a soft segment, and a specific polymer having the same structural unit as that of the soft segment, wherein the content of the specific polymer in the tire case 17 is from 0.20 parts by mass to 2.5 parts by mass, with respect to 100 parts by mass of the thermoplastic elastomer contained in the tire case 17. Therefore, the tire 10 of the present embodiment is excellent in both impact resistance at a low temperature and low loss property.

In addition, in the tire 10 of the present embodiment, since the reinforcing cord 26 having a higher stiffness than the resin material is wound in a spiral shape in the circumferential direction on the outer circumferential surface of the crown portion 16 of the tire case 17 formed of the resin material, the puncture resistance, the cutting resistance, and the stiffness of the tire 10 in the circumferential direction are improved. Further, the improvement of the stiffness of the tire 10 in the circumferential direction prevents the creeping in the tire case 17 formed of the resin material.

In a cross-sectional view taken along the axial direction of the tire case 17 (the cross-section shown in FIG. 1A), at least a part of the reinforcing cord 26 is embedded in the outer circumferential surface of the crown portion 16 of the tire case 17 formed of the resin material, and is in close contact with the resin material, as a result of which incorporation of air during production is suppressed, and movement of the reinforcing cord 26 due to, for example, a force applied at the time of traveling is suppressed. Accordingly, the occurrence of, for example, separation between the reinforcing cord 26, the tire case 17, and the tread 30 is suppressed, and the durability of the tire 10 is improved.

As illustrated in FIG. 2, the depth L of embedding of the reinforcing cord 26 is equal to or greater than ⅕ of the diameter D. Therefore, incorporation of air during production is effectively suppressed, and the movement of the reinforcing cord 26 due to, for example, a force applied at the time of traveling is further suppressed.

Since a circular bead core 18 formed of a metal material is embedded in the bead portion 12, the tire case 17, that is, the tire 10, is strongly fixed to the rim 20, similarly to conventional pneumatic tires made of rubber.

In addition, since a sealing layer 24 formed of a rubber material having higher sealing ability than the resin material constituting the tire case 17 is disposed in a region of the bead portion 12 that contacts the rim 20, sealing ability between the tire 10 and the rim 20 is improved. Therefore, compared with a case in which sealing is carried out only with the rim 20 and the resin material constituting the tire case 17, air leakage from the inside of the tire is further suppressed. Further, by providing the sealing layer 24, also the fittability to the rim is improved.

Although a configuration in which the reinforcing cord 26 is heated is adopted in the first embodiment, for example, a configuration in which the outer circumference of the reinforcing cord 26 is coated with the same resin material as that of the tire case 17 may be adopted. In this case, by heating the coated resin material together with the reinforcing cord 26 when the coated reinforcing cord is wound around the crown portion 16 of the tire case 17, incorporation of air can effectively be suppressed at the time of embedding the reinforcing cord in the crown portion 16.

Helically winding the reinforcing cord 26 is easy in view of production. However, a method in which the reinforcing cord 26 is discontinuous in the width direction, and the like may also be contemplated.

The tire 10 of the first embodiment is a so-called tubeless tire, in which an air chamber is formed between the tire 10 and the rim 20 when the bead portion 12 is fitted onto the rim 20. However, the invention is not limited to this configuration, and the tire may have a complete tube form.

Although modes for carrying out the invention are described above with reference to embodiments, the embodiments are merely examples, and may be practiced with various modifications within a range that does not depart from the gist of the invention. Of course, the protection scope of the invention is not limited to these embodiments.

EXAMPLES

More specific explanation regarding the invention is given below based on Examples. However the invention is not limited thereto.

Example 1

<Synthesis of Hard Segment (HS): Terminal-Modified PA12 (Polyamide 12)>

54.6 g of 12-aminododecanoic acid (manufactured by Sigma-Aldrich Corporation), 750 g of aminododecanolactam, and 46 g of dodecanedioic acid (a chain extending agent that forms a linking portion) were placed in a reaction vessel of volume 2 L, equipped with a stirrer, a nitrogen gas inlet, and a condensed water outlet. The gas inside the vessel was thoroughly substituted by nitrogen, and then the temperature was raised to 280° C., and the mixture was allowed to react for 4 hours under pressure of 1.2 MPa. After the pressure was released, the mixture was allowed to react for an additional one hour under a nitrogen gas flow, to obtain a white solid that was a PA12 polymer (terminal-modified PA12, namely, a substance in which dodecanedioic acid is bonded to one terminal of PA12) having a number average molecular weight of 3,900 (polymerization reaction A).

<Production of Thermoplastic Elastomer>

The terminal-modified PA12 thus obtained was weighed by 300 g, and 154 g of polyoxypropylenediamine (ELASTAMINE RP-2009, manufactured by HUNTSMAN Corporation; number average molecular weight: 2,000) as a polymer that forms the soft segment were added thereto. The mixture was stirred at 230° C. for 7.5 hours, and then 9 g of the terminal-modified PA12 were further added thereto, followed by stirring for one hour (polymerization reaction B). Then, 1 g of IRGANOX 1010 was added thereto, to obtain a white resin material containing a polyamide-based thermoplastic elastomer.

The number average molecular weight of the polyamide-based thermoplastic elastomer incorporated in the resulting resin material was 135,000, and the ratio (x/y) of the mass of the hard segment (x) to the mass of the soft segment (y) was 66/34. The specific polymer incorporated in the resulting resin material was a compound having the same structural unit as that of the polyoxypropylenediame added, having a number average molecular weight of 2,000, and having amino groups at both terminals.

The resin material thus obtained was pelletized, and injection molding was performed at 220° C., to obtain a sample piece. Measurements were carried out using a sample produced by punching a test piece from this sample piece.

Example 2 to Example 5, Comparative Example 1 to Comparative Example 3

Resin materials were obtained in a manner substantially similar to that in Example 1 except that, in polymerization reaction B, before further adding the terminal-modified PA12, the mixture was stirred at 230° C. for a period of time shown in Table 1 (polymerization time) instead of stirring at 230° C. for 7.5 hours.

The number average molecular weight of the polyamide-based thermoplastic elastomer incorporated in the resulting resin material and the ratio (x/y) of the mass of the hard segment (x) to the mass of the soft segment (y) were the same as those in Example 1, respectively.

Example 6

<Synthesis of Hard Segment (HS): Terminal-Modified PA6 (Polyamide 6)>

400 g of caprolactam (manufactured by Sigma-Aldrich Corporation), 51 g of dodecanedioic acid (a chain extending agent that forms a linking portion) and 62 g of aminohexanoic acid were placed in a reaction vessel of volume 2 L, equipped with a stirrer, a nitrogen gas inlet, and a condensed water outlet. The gas inside the vessel was thoroughly substituted by nitrogen, and then the temperature was raised to 280° C., and the mixture was allowed to react for 4 hours under pressure of 0.6 MPa. After the pressure was released, the mixture was allowed to react for an additional one hour under a nitrogen gas flow, to obtain a white solid that was a desired PA6 polymer (terminal-modified PA6, namely, a substance in which dodecanedioic acid is bonded to one terminal of PA6) having a number average molecular weight of 2,000.

The terminal-modified PA6 thus obtained was washed with water and then weighed by 300 g. Further, 154 g of polytetramethylene glycol/polyoxypropylenediamine (model number: XTJ-542, manufactured by HUNTSMAN Corporation; number average molecular weight: 1,000) as a polymer that forms the soft segment were added thereto. The mixture was stirred at 230° C. for 4.5 hours. Then, 1 g of IRGANOX 1010 was added thereto, to obtain a white resin material containing a polyamide elastomer-based thermoplastic elastomer.

The number average molecular weight of the polyamide-based thermoplastic elastomer incorporated in the resulting resin material was 135,000, and the ratio (x/y) of the mass of the hard segment (x) to the mass of the soft segment (y) was 67/33. The specific polymer incorporated in the resulting resin material was a compound having the same structural units as those of the polyteteramethylene glycol/polyoxypropylenediame added, having a number average molecular weight of 1,000, and having amino groups at both terminals.

The resin material thus obtained was pelletized, and injection molding was performed at 260° C., to obtain a sample piece. Measurements were carried out using a sample produced by punching a test piece from this sample piece.

sample, which was produced by punching a test piece from the sample piece using a mold of 40 mm×100 mm with a thickness of 2 mm. Results are shown in Table 1.

(Measurement of Content of Specific Polymer)

With regard to the obtained samples, the content of the specific polymer was measured according to the method described above.

(Measurement of Injection Molding Weighing Time)

In the process of obtaining the sample piece, the weighing time indicated on the injection molding machine is designated as the "injection molding weighing time".

(Measurement of Impact Resistance at Low Temperature)

According to the technique defined in JIS K7111-1, using a Charpy impact tester (product name: Model 141, manufactured by YASUDA SEIKI SEISAKUSHO LTD.), measurement was performed using the obtained sample, which was cooled until the surface temperature reached −40° C.

Specifically, the angle rebound after collision to the sample under the conditions of a nominal pendulum energy (estimation) of 25 J and a lift angle of the hammer of 150° was measured and, from the difference between the angles before and after the collision, the amount of energy consumed (the amount of energy absorbed) was calculated. With respect to the amount of absorbed energy thus obtained, a value (a reduced value) converted such that the result of Comparative Example 1 becomes 100 is determined. Note that, regarding the reduced values of the impact resistance at a low temperature, which are shown in Table 1, a greater value means higher impact resistance.

(Evaluation of Low Loss Property)

Using a viscoelasticity measuring apparatus (manufactured by Rheometrics Inc.) and using a sample of $\phi 8$ mm with a thickness of 2 mm, the loss tangent (tan $\delta$) was measured at a temperature of 30° C., a distortion of 1%, and a frequency of 20 Hz. With regard to the obtained actual value of loss tangent, a value converted such that the actual value in Example 1, which is the lowest loss material, becomes 100 is shown in Table 1. Note that, the smaller the reduced value (namely, the smaller the loss tangent), the more excellent in terms of low loss property.

TABLE 1

|  | Ex-1 | Ex-2 | Ex-3 | Ex-4 | Ex-5 | Ex-6 | C. Ex-1 | C. Ex-2 | C. Ex-3 |
| --- | --- | --- | --- | --- | --- | --- | --- | --- | --- |
| Polymerization time (hours) | 7.5 | 7 | 6 | 5 | 4.5 | 4.5 | 4 | 3.5 | 8 |
| Content of Specific Polymer (parts by mass) | 0.2 | 0.3 | 0.45 | 0.56 | 0.75 | 0.75 | 2.6 | 3.5 | 0.15 |
| Injection Molding Weighing Time (seconds) | 7 | 9 | 10.5 | 12 | 15 | 15 | 20 | 35 | 6 |
| Impact Resistance at Low Temperature (reduced value) | 89 | 94 | 96 | 98 | 100 | 101 | 100 | 105 | 82 |
| Low Loss Property | 100 | 100 | 100 | 100 | 100 | 98 | 104 | 110 | 100 |

In Table 1, the abbreviation "Ex." denotes "Example Number", and the abbreviation "C. Ex." denotes "Comparative Example Number".

[Evaluation]

Using the resin materials obtained in Examples and Comparative Examples, evaluation was performed with respect to the following items. Specifically, the obtained resin material was pelletized, and using an "SE30D", manufactured by Mitsubishi Heavy Industries Co., Ltd., as the injection molding machine, injection molding was performed under the conditions of a molding temperature of 220° C. and a temperature of the mold of 50° C., to obtain a sample piece. Measurements were carried out using a As is evident from Table 1, in Examples, the low loss property was favorable, compared with Comparative Example 1 and Comparative Example 2, in which the content of the specific polymer was higher than the above range. Further, in Examples, the impact resistance at a low temperature was high, compared with Comparative Example 3, in which the content of the specific polymer was lower than the above range. From the above, it is understood that, since the content of the specific polymer is within the above range in Examples, both the low loss property and the impact resistance at a low temperature can be achieved.

The disclosure of Japanese Patent Application No. 2014-193429 filed on Sep. 24, 2014 is incorporated in the present specification by reference in its entirety. All publications, patent applications, and technical standards mentioned in the present specification are incorporated by reference in the present specification to the same extent as if each individual publication, patent application, or technical standard was specifically and individually indicated to be incorporated by reference.

What is claimed is:

1. A tire comprising a tire frame that is formed of a resin material and has a circular form,
   the resin material comprising a thermoplastic elastomer having a hard segment and a soft segment, and a polymer compound that has the same structural unit as the structural unit of the soft segment and which is different from the thermoplastic elastomer, and
   the content of the polymer compound in the tire frame being from 0.20 parts by mass to 2.5 parts by mass with respect to 100 parts by mass of the thermoplastic elastomer contained in the tire frame, wherein the thermoplastic elastomer comprises at least one selected from the group consisting of a polyamide-based thermoplastic elastomer, a polyester-based thermoplastic elastomer, and a polyurethane-based thermoplastic elastomer.

2. The tire according to claim 1, wherein the number average molecular weight of the polymer compound is from 0.3 times to 6 times the number average molecular weight of the soft segment in the thermoplastic elastomer.

3. The tire according to claim 1, wherein the polymer compound comprises a residue of a polymer compound that forms the soft segment.

4. The tire according to claim 1, wherein the ratio (x/y) of a mass of the hard segment (x) to a mass of the soft segment (y) in the thermoplastic elastomer is from 30/70 to 80/20.

5. The tire according to claim 4, wherein the number average molecular weight of the polymer compound is from 0.3 times to 6 times the number average molecular weight of the soft segment in the thermoplastic elastomer, and wherein the polymer compound comprises a residue of a polymer compound that forms the soft segment.

6. The tire according to claim 1, further comprising a reinforcing cord layer, wherein the reinforcing cord layer is formed on an outer circumference side of a crown portion of the tire case.

7. The tire according to claim 6, wherein a reinforcing cord in the reinforcing cord layer is a steel cord.

8. The tire according to claim 7, wherein the reinforcing cord layer consists of a single cord layer.

9. The tire according to claim 1, wherein the tire frame comprises:
   a pair of bead portions,
   a pair of side portions, each of which extends from each of the bead portions toward the outer side in the tire radial direction; and
   a crown portion that connects the outer end in the tire radial direction of one side portion and the outer end in the tire radial direction of the other side portion; and
   wherein an annular bead core of a steel cord is embedded in each of the bead portions.

* * * * *